United States Patent
Shaw et al.

(10) Patent No.: US 11,539,787 B2
(45) Date of Patent: Dec. 27, 2022

(54) 5G ENABLED MASSIVELY DISTRIBUTED ON-DEMAND PERSONAL CLOUD SYSTEM AND METHOD

(71) Applicant: T-Mobile USA, Inc., Bellevue, WA (US)

(72) Inventors: Venson Shaw, Kirkland, WA (US); Sunil Lingayat, Issaquah, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 86 days.

(21) Appl. No.: 16/864,083

(22) Filed: Apr. 30, 2020

(65) Prior Publication Data

US 2021/0344744 A1   Nov. 4, 2021

(51) Int. Cl.
| | |
|---|---|
| G06F 15/16 | (2006.01) |
| H04L 67/10 | (2022.01) |
| G06Q 50/26 | (2012.01) |
| G06Q 10/06 | (2012.01) |
| G06Q 30/02 | (2012.01) |
| H04L 67/306 | (2022.01) |
| H04L 41/0803 | (2022.01) |

(Continued)

(52) U.S. Cl.
CPC ....... *H04L 67/10* (2013.01); *G06Q 10/06315* (2013.01); *G06Q 20/127* (2013.01); *G06Q 30/0201* (2013.01); *G06Q 50/265* (2013.01); *H04L 41/0803* (2013.01); *H04L 67/306* (2013.01); *H04L 67/52* (2022.05); *H04W 84/042* (2013.01)

(58) Field of Classification Search
None
See application file for complete search history.

(56) References Cited

U.S. PATENT DOCUMENTS

| | | |
|---|---|---|
| 8,892,649 B2 | 11/2014 | Gopinath et al. |
| 8,910,278 B2 | 12/2014 | Davne et al. |

(Continued)

FOREIGN PATENT DOCUMENTS

| | | |
|---|---|---|
| CN | 104392373 A | 3/2015 |
| DE | 112018000226 T5 | 9/2019 |

(Continued)

OTHER PUBLICATIONS

U.S. Appl. No. 16/864,100, filed Apr. 30, 2020; titled 5G On-Demand Dynamically Instantiated Blockchain for Highly Distributed Peer-to-Peer Consumer Cloud.

*Primary Examiner* — Brian Whipple
*Assistant Examiner* — Gregory P Tolchinsky
(74) *Attorney, Agent, or Firm* — Perkins Coie LLP (57) ABSTRACT

The technology described herein allocates resources in a cloud computing environment using a 5G network. The system can connect a device to the 5G network and collect data related to the device such as a location of the device and characteristics of use of the device with the 5G network. The system can create a device service profile of the device based at least in part on the data related to the device. The system can then dynamically partition computing resources within the cloud computing environment for the device based on the device service profile and a time-of-day in the location of the device to thereby provide on-demand access to content or services in the cloud computing environment to the device over the 5G network.

20 Claims, 6 Drawing Sheets

(51) Int. Cl.
  *G06Q 20/12* (2012.01)
  *H04L 67/52* (2022.01)
  *H04W 84/04* (2009.01)

(56) References Cited

U.S. PATENT DOCUMENTS

| | | |
|---|---|---|
| 8,924,561 B2 | 12/2014 | Brown et al. |
| 9,455,882 B2 | 9/2016 | Matczynski et al. |
| 9,635,000 B1 | 4/2017 | Muftic |
| 10,009,284 B2 | 6/2018 | Khan et al. |
| 10,102,265 B1 | 10/2018 | Madisetti et al. |
| 10,367,796 B2 | 7/2019 | Blake et al. |
| 10,409,783 B1 | 9/2019 | Miller et al. |
| 10,490,304 B2 | 11/2019 | Shah |
| 10,506,104 B1 | 12/2019 | Shakeri |
| 10,541,807 B1 | 1/2020 | Morimura et al. |
| 10,574,748 B2 | 2/2020 | Doddavula et al. |
| 11,057,462 B2 | 7/2021 | Brock |
| 11,128,437 B1 | 9/2021 | Nossik et al. |
| 11,218,313 B1 | 1/2022 | Raghavan et al. |
| 11,238,448 B1 | 2/2022 | Narayanan et al. |
| 11,250,493 B2 | 2/2022 | Isaacson et al. |
| 11,257,073 B2 | 2/2022 | Padmanabhan |
| 2010/0217850 A1 | 8/2010 | Ferris |
| 2010/0318999 A1 | 12/2010 | Zhao et al. |
| 2012/0173731 A1 | 7/2012 | Lin et al. |
| 2012/0246323 A1 | 9/2012 | Gopinath et al. |
| 2013/0236877 A1 | 9/2013 | Zhou et al. |
| 2014/0032651 A1 | 1/2014 | Singh et al. |
| 2016/0113018 A1 | 4/2016 | Li |
| 2016/0294920 A1 | 10/2016 | Besprosvan |
| 2016/0321654 A1 | 11/2016 | Lesavich et al. |
| 2017/0331896 A1 | 11/2017 | Holloway et al. |
| 2017/0353531 A1 | 12/2017 | Conn |
| 2017/0367036 A1* | 12/2017 | Chen .................. H04L 43/08 |
| 2018/0047111 A1 | 2/2018 | Vieira et al. |
| 2018/0114205 A1 | 4/2018 | Thomas et al. |
| 2018/0144340 A1 | 5/2018 | Kinnaird et al. |
| 2018/0189312 A1 | 7/2018 | Alas et al. |
| 2018/0189449 A1 | 7/2018 | Karumba et al. |
| 2018/0239897 A1 | 8/2018 | Ventura |
| 2018/0242224 A1* | 8/2018 | Pinheiro .............. H04W 48/16 |
| 2018/0278427 A1 | 9/2018 | Thakore et al. |
| 2018/0309567 A1 | 10/2018 | Wooden |
| 2018/0322489 A1 | 11/2018 | Altenhofen et al. |
| 2018/0343120 A1 | 11/2018 | Andrade |
| 2019/0034892 A1 | 1/2019 | Smith et al. |
| 2019/0034922 A1 | 1/2019 | Castinado et al. |
| 2019/0043050 A1 | 2/2019 | Smith et al. |
| 2019/0082326 A1* | 3/2019 | Mathison .............. H04W 8/18 |
| 2019/0102837 A1 | 4/2019 | Smith et al. |
| 2019/0104437 A1 | 4/2019 | Bartfai-Walcott et al. |
| 2019/0149325 A1 | 5/2019 | Garagiola et al. |
| 2019/0149600 A1 | 5/2019 | Duan et al. |
| 2019/0165943 A1 | 5/2019 | Chari et al. |
| 2019/0179672 A1 | 6/2019 | Christidis et al. |
| 2019/0182055 A1 | 6/2019 | Christidis et al. |
| 2019/0182254 A1 | 6/2019 | Christidis et al. |
| 2019/0188654 A1 | 6/2019 | Albrecht |
| 2019/0190896 A1 | 6/2019 | Singh |
| 2019/0220854 A1 | 7/2019 | Pesci et al. |
| 2019/0229891 A1 | 7/2019 | Naqvi et al. |
| 2019/0268284 A1 | 8/2019 | Karame et al. |
| 2019/0311148 A1 | 10/2019 | Andrade |
| 2019/0318353 A1 | 10/2019 | Castinado et al. |
| 2019/0325227 A1 | 10/2019 | Smith et al. |
| 2019/0325430 A1 | 10/2019 | Cui et al. |
| 2019/0333031 A1 | 10/2019 | Kravitz |
| 2019/0334719 A1 | 10/2019 | Naqvi et al. |
| 2019/0339668 A1 | 11/2019 | Biernat et al. |
| 2019/0341134 A1 | 11/2019 | Shah |
| 2019/0349426 A1 | 11/2019 | Smith et al. |
| 2019/0349733 A1 | 11/2019 | Nolan et al. |
| 2019/0363892 A1 | 11/2019 | Wang |
| 2019/0364492 A1* | 11/2019 | Azizi .................... H04W 48/16 |
| 2019/0370358 A1 | 12/2019 | Nation et al. |
| 2019/0372837 A1* | 12/2019 | Yang .................. H04L 41/5054 |
| 2019/0379544 A1 | 12/2019 | Suthar et al. |
| 2019/0379754 A1 | 12/2019 | Krishnaswamy |
| 2019/0384587 A1 | 12/2019 | Rao et al. |
| 2019/0385154 A1 | 12/2019 | Cui et al. |
| 2019/0386817 A1 | 12/2019 | Carson et al. |
| 2019/0386969 A1 | 12/2019 | Verzun et al. |
| 2019/0392434 A1 | 12/2019 | Castinado et al. |
| 2019/0394047 A1 | 12/2019 | Karame et al. |
| 2020/0007555 A1 | 1/2020 | Jadhav et al. |
| 2020/0043115 A1 | 2/2020 | Nelson et al. |
| 2020/0044848 A1 | 2/2020 | Chari et al. |
| 2020/0051015 A1 | 2/2020 | Davis et al. |
| 2020/0067714 A1 | 2/2020 | Nair |
| 2020/0075056 A1 | 3/2020 | Yang et al. |
| 2020/0082112 A1 | 3/2020 | Altshuler et al. |
| 2020/0092361 A1 | 3/2020 | Viswanathan et al. |
| 2020/0099698 A1 | 3/2020 | Kundu et al. |
| 2020/0112443 A1 | 4/2020 | Todd |
| 2020/0117791 A1 | 4/2020 | Bingham et al. |
| 2020/0117823 A1 | 4/2020 | Ojha et al. |
| 2020/0119906 A1 | 4/2020 | Das et al. |
| 2020/0125757 A1 | 4/2020 | McKendree et al. |
| 2020/0186607 A1* | 6/2020 | Murphy ................ H04L 9/0637 |
| 2020/0195495 A1 | 6/2020 | Parker et al. |
| 2020/0242591 A1 | 7/2020 | Sevindik |
| 2020/0250747 A1 | 8/2020 | Padmanabhan |
| 2020/0351650 A1 | 11/2020 | Maria |
| 2020/0396065 A1 | 12/2020 | Gutierrez-Sheris |
| 2020/0396787 A1 | 12/2020 | Brugman |
| 2021/0050992 A1 | 2/2021 | Marshall et al. |
| 2021/0097198 A1 | 4/2021 | Blaikie et al. |
| 2021/0117860 A1 | 4/2021 | Ergen |
| 2021/0135857 A1 | 5/2021 | Parvataneni et al. |
| 2021/0203756 A1 | 7/2021 | Yerli et al. |
| 2021/0258373 A1 | 8/2021 | Syed et al. |
| 2021/0263667 A1 | 8/2021 | Whitlock et al. |
| 2021/0266762 A1* | 8/2021 | Stawiarski ............ H04W 8/183 |
| 2021/0303552 A1 | 9/2021 | Pandey et al. |
| 2021/0344744 A1 | 11/2021 | Shaw et al. |
| 2021/0406250 A1 | 12/2021 | Novo Diaz et al. |
| 2022/0019366 A1 | 1/2022 | Freilich et al. |
| 2022/0019367 A1 | 1/2022 | Freilich et al. |
| 2022/0052988 A1 | 2/2022 | Gadnis et al. |
| 2022/0083245 A1 | 3/2022 | Kant et al. |
| 2022/0086242 A1 | 3/2022 | Murphy et al. |

FOREIGN PATENT DOCUMENTS

| | | |
|---|---|---|
| EP | 2583211 A2 | 4/2013 |
| EP | 3013095 A1 | 4/2016 |
| EP | 3420516 A1 | 1/2019 |
| EP | 3420518 A1 | 1/2019 |
| EP | 3455802 A1 | 3/2019 |
| EP | 3458982 A1 | 3/2019 |
| EP | 3497632 A1 | 6/2019 |
| EP | 3532968 A1 | 9/2019 |
| EP | 3549048 A1 | 10/2019 |
| EP | 3375161 B1 | 12/2019 |
| JP | 2016082569 A | 5/2016 |
| JP | 3222165 U | 7/2019 |
| JP | 2019145095 A | 8/2019 |
| KR | 20190107601 A | 9/2019 |
| WO | 2014174399 A2 | 10/2014 |
| WO | 2017194976 A1 | 11/2017 |
| WO | 2018019364 A1 | 2/2018 |
| WO | 2018031451 A1 | 2/2018 |
| WO | 2018130162 A1 | 7/2018 |
| WO | 2018231255 A1 | 12/2018 |
| WO | 2019005104 A1 | 1/2019 |
| WO | 2019009913 A1 | 1/2019 |
| WO | 2019009914 A1 | 1/2019 |
| WO | 2019045739 A1 | 3/2019 |

* cited by examiner

5G ENABLED MASSIVELY DISTRIBUTED ON-DEMAND PERSONAL CLOUD SYSTEM AND METHOD

BACKGROUND

Cloud computing is the on-demand availability of computer system resources, such as data storage and computing power, without direct active management by the user. The term is generally used to describe data centers available to many users over the Internet. Large clouds often have functions distributed over multiple locations from central servers. Clouds can be limited to a single organization (enterprise clouds) or can be available to many organizations (public cloud). The goal of cloud computing is to allow users to benefit from various technologies without the need for deep knowledge about or expertise with each one of them. The cloud aims to cut costs and reduce the amount of time users spend on solving information technology issues.

BRIEF DESCRIPTION OF THE DRAWINGS

Embodiments of the present technology will be described and explained through the use of the accompanying drawings.

The drawings, some components and/or operations can be separated into different blocks or combined into a single block when discussing some embodiments of the present technology. Moreover, while the technology is amenable to various modifications and alternative forms, specific embodiments have been shown by way of example in the drawings and are described in detail below. The intention, however, is not to limit the technology to the particular embodiments described herein. On the contrary, the technology is intended to cover all modifications, equivalents, and alternatives falling within the scope of the technology as defined by the appended claims.

DETAILED DESCRIPTION

The disclosed systems and methods allocate resources in a cloud computing environment using a 5G network. As millions and potentially billions of Internet of Things (IoT) devices become connected to the 5G network, cloud service providers will need to allocate resources carefully to provide service to all the devices. Telecom companies are uniquely positioned to provide various cloud services partitioned by entity (e.g., device, user, group of users, group of devices). A telecom provider can create a device service profile for a device (or a user service profile for a user) based on the location of the device and characteristics of interactions between the device (or the user) and the 5G network. The system can dynamically partition computing resources within the cloud computing environment (e.g., create mini clouds) for the device (or user) based on the profile and a time-of-day in the location of the device to provide on-demand access to content or services in the cloud computing environment to the device over the 5G network. For example, additional network and cloud resources can be provided to regions in the daytime or, in the case of an emergency or natural disaster, in the location of the device or user. This prioritization and scheduling of service allows for a cloud provider to service many customers, such as for customers with non-overlapping regions and typical time-of-day usage. If the user requests access to service or content during times that the computing resources are not partitioned for the device (or the user), the system can intelligently re-partition the computing resources from devices (or users) that are not using the computing resources partitioned for them.

To prevent cyber-attacks, using the massively scalable cloud solution for entities, blockchains can be used to validate interactions between entities in the cloud computing environment (e.g., connecting the dynamically partitioned computing resources for the mobile devices, network servers or any of the various other network-connected entities). In doing so, the system can create partitions (e.g., mini clouds) for each entity based on information collected by a 5G network. The system can create a blockchain ledger for interactions between entities, with each blockchain ledger being unique to the entities interacting with one another. When an entity requests an interaction with another entity or upon a different triggering event, the blockchain ledger for those entities can be activated from a dormant state (e.g., allocate computing resources to the blockchain ledger). After receiving consensus from a blockchain community, the interaction can be allowed and appended to the blockchain ledger. Additionally, various partitioned computing resources can act as nodes to approve or disapprove of the interactions using previous interactions and information related to the device or the person in the analysis. Creating an immutable record and providing a means for group-based validation of devices can be particularly helpful given the expected number of devices to be connected to the 5G network.

Thus, the described 5G enabled, massively distributed on-demand personal cloud system and method can provide more efficient and targeted resource allocation and thereby better access to content and services for end users. This is done using device and user profiles created by the present system, within the 5G network, and stored in a unified data management database. Based on the profiles, the system can then partition computing resources on a per-user or per-device basis and using time-of-day partitioning. Additional techniques to safeguard the 5G network using distributed ledger technology are described in U.S. patent application Ser. No. 16/864,100, filed Apr. 30, 2020, entitled "5G On-Demand Dynamically Instantiated Blockchain For Highly Distributed Peer-To-Peer Consumer Cloud," which is incorporated by reference in its entirety for all purposes.

Various embodiments of the disclosed systems and methods are described. The following description provides specific details for a thorough understanding and an enabling description of these embodiments. One skilled in the art will understand, however, that the invention can be practiced without many of these details. Additionally, some well-known structures or functions may not be shown or described in detail for the sake of brevity. The terminology used in the description presented below is intended to be interpreted in its broadest reasonable manner, even though it is being used in conjunction with a detailed description of certain specific embodiments of the invention.

Although not required, embodiments are described below in the general context of computer-executable instructions, such as routines executed by a general-purpose data processing device, e.g., a networked server computer, mobile device, or personal computer. Those skilled in the relevant art will appreciate that the invention can be practiced with other communications, data processing, or computer system configurations, including Internet appliances, handheld devices, wearable computers, all manner of cellular or mobile phones, multi-processor systems, microprocessor-based or programmable consumer electronics, set-top boxes, network PCs, mini-computers, mainframe computers, media players and the like. Indeed, the terms "computer," "server," and the like are generally used interchangeably herein and refer to any of the above devices and systems, as well as any data processor.

While aspects of the disclosed embodiments, such as certain functions, can be performed exclusively or primarily on a single device, some embodiments can also be practiced in distributed environments where functions or modules are shared among disparate processing devices, which are linked through a communications network, such as a local area network (LAN), wide area network (WAN), or the Internet. In a distributed computing environment, program modules can be located in both local and remote memory storage devices.

Aspects of the invention can be stored or distributed on tangible computer-readable media, including magnetically or optically readable computer discs, hardwired or preprogrammed chips (e.g., EEPROM semiconductor chips), nanotechnology memory, biological memory, or other data storage media. In some embodiments, computer-implemented instructions, data structures, screen displays, and other data under aspects of the invention can be distributed over the Internet or over other networks (including wireless networks), on a propagated signal on a propagation medium (e.g., an electromagnetic wave(s), a sound wave) over a period of time, or they can be provided on any analog or digital network (packet-switched, circuit-switched, or other scheme).

Cloud Computing

Figure 1:
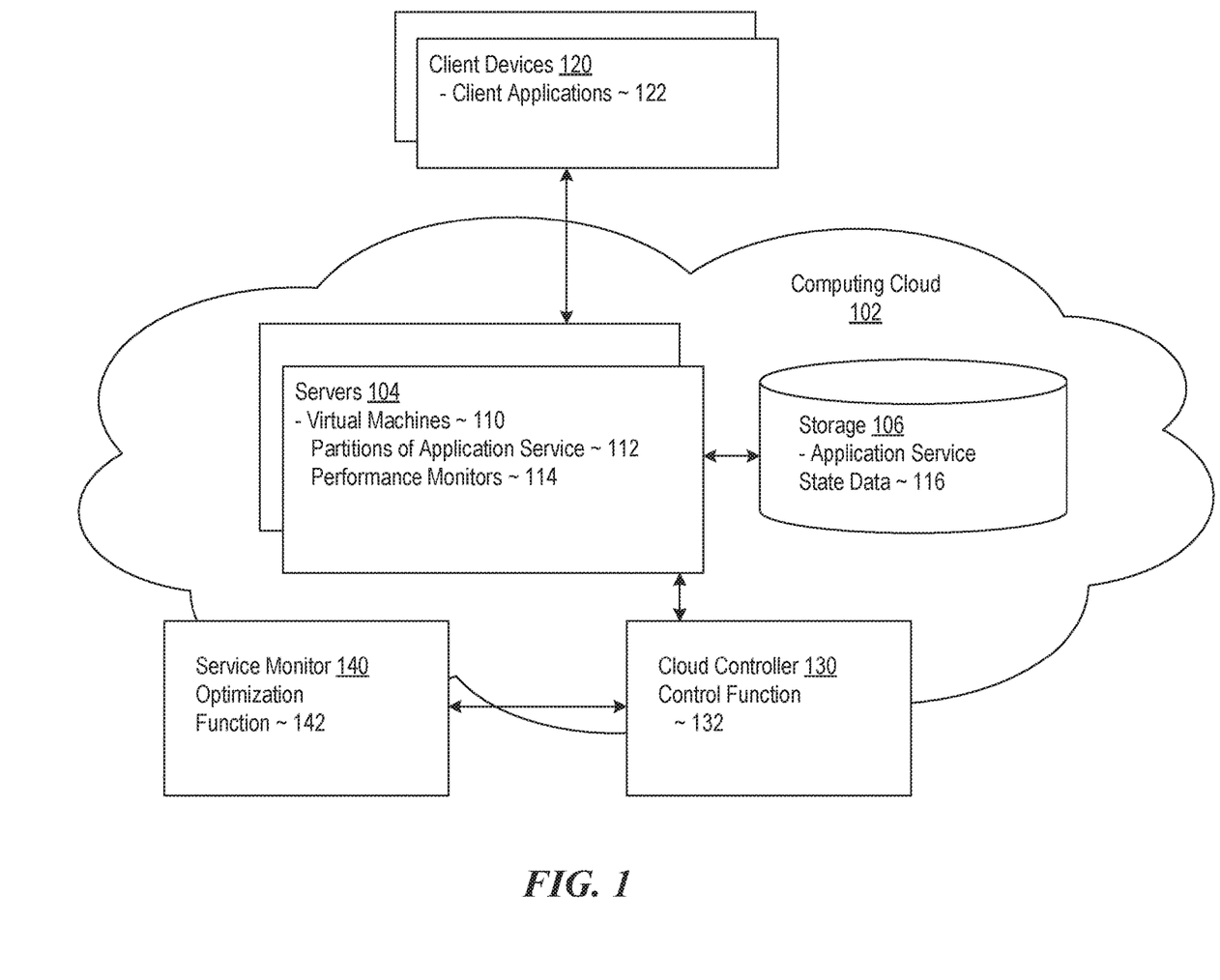
FIG. 1 is a block diagram that illustrates an overview of a cloud computing environment.

FIG. 1 illustrates an overview of a cloud computing environment. As illustrated, computing cloud 102 can include servers 104 and storage 106. Servers 104 and storage 106 can be coupled with each other directly using, for example, cables (not shown) or indirectly via one or more wired or wireless, local or wide area networks (not shown). Each server 104 can be configured to host one or more virtual machines 110. Each virtual machine 110 can be configured to host one or more instances of application service 112, or partitions thereof, to be described more fully below. Storage 106 can store state data 116 of application service 112. Each instance of application service 112 can service some client applications 122 operating on respective client devices 120. Client devices 120 can be selectively coupled with servers 104 via one or more wired or wireless, local or wide area networks (not shown). Client devices 120 can include any type of electronic device that can communicate wirelessly with a network node and/or with another electronic device in a cellular, computer, and/or mobile communications system. Examples of the client devices 120 includes smartphones (e.g., APPLE IPHONE, SAMSUNG GALAXY), tablet computers (e.g., APPLE IPAD, SAMSUNG NOTE, AMAZON FIRE, MICROSOFT SURFACE), wireless devices capable of machine-to-machine (M2M) communication, wearable electronic devices, IoT devices, and other devices capable of accessing the network(s).

Computing cloud 102 can further include cloud controller 130 having controller functions 132 configured to control allocation of various hardware and or software resources of computing cloud 102 (e.g., resources of servers 104, storage 106, and the networks coupling them) for deployment of virtual machines 110, application service 112, and performance monitors 114, and/or operating these elements.

In some implementations, each virtual machine 110 can include a performance monitor 114 configured to observe, collect, and report performance information associated with the service provided to client applications 122, by the partitions of application service 112. In alternative implementations, each server 102 can be provided with a performance monitor 114 configured to observe, collect, and report performance information associated with the service provided to client applications 122, by the partitions of application service 112 hosted by the virtual machines 110 deployed thereon, instead.

Computing cloud 102 can include service monitor 140 having optimization function 142, configured to receive the performance information collected and reported by performance monitors 114, and in response, dynamically identify and request resource adjustments to cloud controller 130 to adjust the deployments and/or allocation of the various hardware and/or software resources to the deployments of the various instances of (the partitions) of application service 112 to improve the performance of the service provided to client applications 122 by the instances of application service 112. Application service 112 can be any number of application services known in the art, including but not limited to content distribution and e-commerce services.

Distributed Ledger

A digital distributed ledger stores digital records of things such as transactions and interactions that are distributed and maintained among nodes of a computer network, where the entries are stored in blocks of the ledger that are cryptographically related. A public blockchain is a common example of a distributed ledger that can record transactions (e.g., interactions) between parties in a verifiable and permanent way. Specifically, a blockchain system has a decentralized, distributed database where a ledger is maintained by peer nodes. Hence, an intermediary is not required to maintain a blockchain. The transactions are typically authenticated with cryptographic hashing and mining techniques.

A blockchain is analogous to a distributed database on a distributed computing system that maintains a continuously growing list of ordered records called blocks. A block of a blockchain includes records of transaction(s) or other recorded data (e.g., condition data). Each block contains at least one timestamp, and a block links to a previous block to thus form a chain of blocks. Blockchains are inherently resistant to modification of their recorded data. That is, once recorded, the data in a block cannot be altered retroactively. Through a peer network and distributed timestamping, a blockchain is managed in an autonomous manner.

Decentralized consensus can be achieved with a blockchain. This makes blockchains suitable for recording events, condition records, other records management activities, identity management, transaction processing, and proving data provenance. Well-known examples of decentralized systems that implement blockchains include Bitcoin and Ethereum cryptocurrencies. These types of systems provide a pragmatic solution for arriving at a consensus in the face of trust and timing problems typically encountered in distributed networks.

Figure 2:
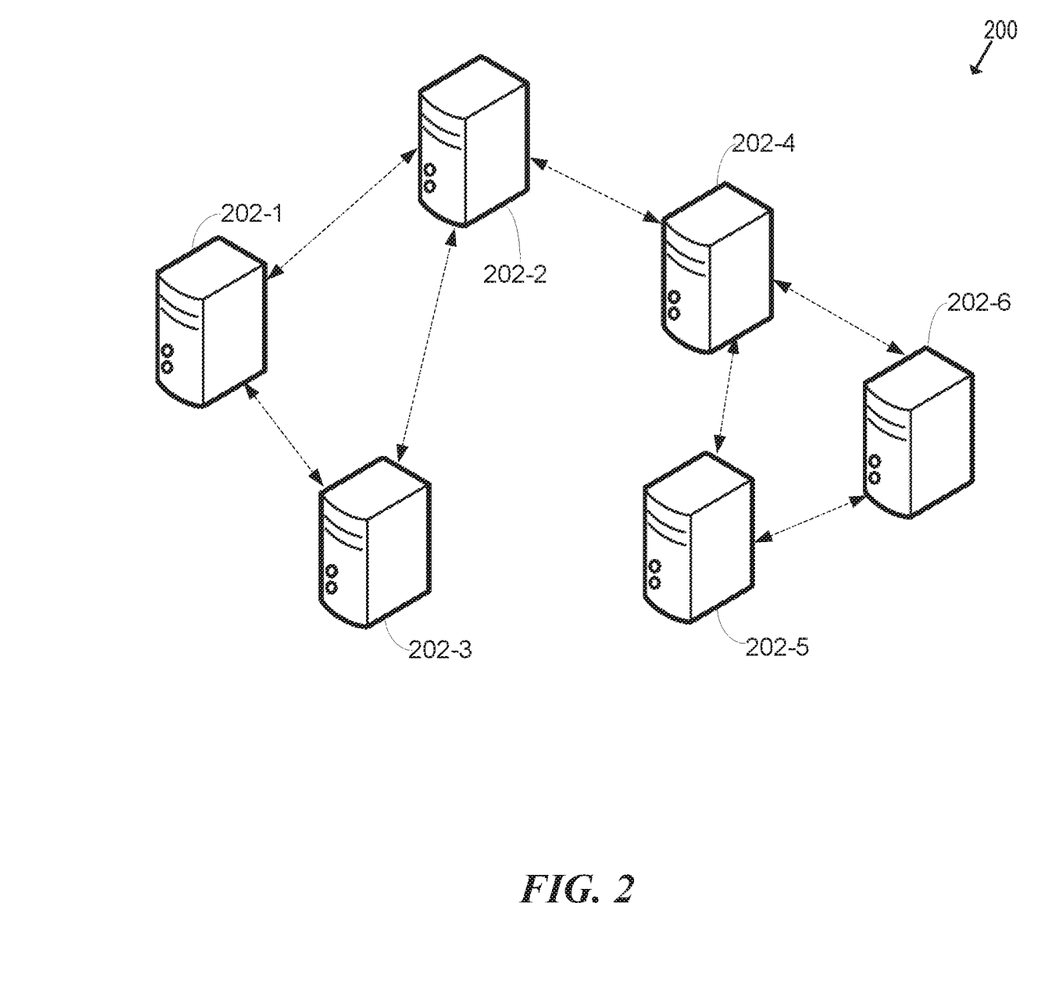
FIG. 2 is a block diagram that illustrates a network of peer nodes that can store a distributed ledger.

FIG. 2 illustrates a network 200 of interconnected peer nodes 202-1 through 202-6 (also referred to collectively as peer nodes 202 and individually as peer node 202). The peer nodes 202 can be distributed across various geographic locations including regions all over the world. The network 200 can include a combination of private, public, wired, or wireless portions. Data communicated over a network 200 can be encrypted or unencrypted at various locations or portions of the network. Each peer node 202 can include combinations of hardware and/or software to process data, perform functions, communicate over the network 200, and the like.

The peer nodes 202 can include computing devices such as servers, desktop or laptop computers (e.g., APPLE MACBOOK, LENOVO 440), handheld mobile devices (e.g., APPLE IPHONE, SAMSUNG GALAXY), and any other electronic device. Any component of the network 200 can include a processor, memory or storage, a network transceiver, a display, operating system and application software (e.g., for providing a user interface), and the like. Other components, hardware, and/or software included in the network 200 that are well known to persons skilled in the art are not shown or discussed herein for the sake of brevity.

The network 200 can implement a blockchain that allows for the secure management of a shared ledger, where transactions are verified and stored on the network 200 without a governing central authority. Blockchains can be implemented in different configurations, ranging from public, open-source networks to private blockchains that require explicit permission to read or write transactions. Central to a blockchain are cryptographic hash functions that secure the network 200, in addition to enabling transactions, to protect a blockchain's integrity and anonymity.

The network 200 can utilize cryptography to securely process data. For example, public-key cryptography uses asymmetric key algorithms, where a key used by one party to perform either encryption or decryption is not the same as the key used by another in the counterpart operation. Each party has a pair of cryptographic keys: a public encryption key and a private decryption key. For example, a key pair used for digital signatures consists of a private signing key and a public verification key. The public key can be widely distributed, while the private key is known only to its proprietor. The keys are related mathematically, but the parameters are chosen so that calculating the private key from the public key is unfeasible. Moreover, the keys could be expressed in various formats, including hexadecimal format.

System Overview

Figure 3:
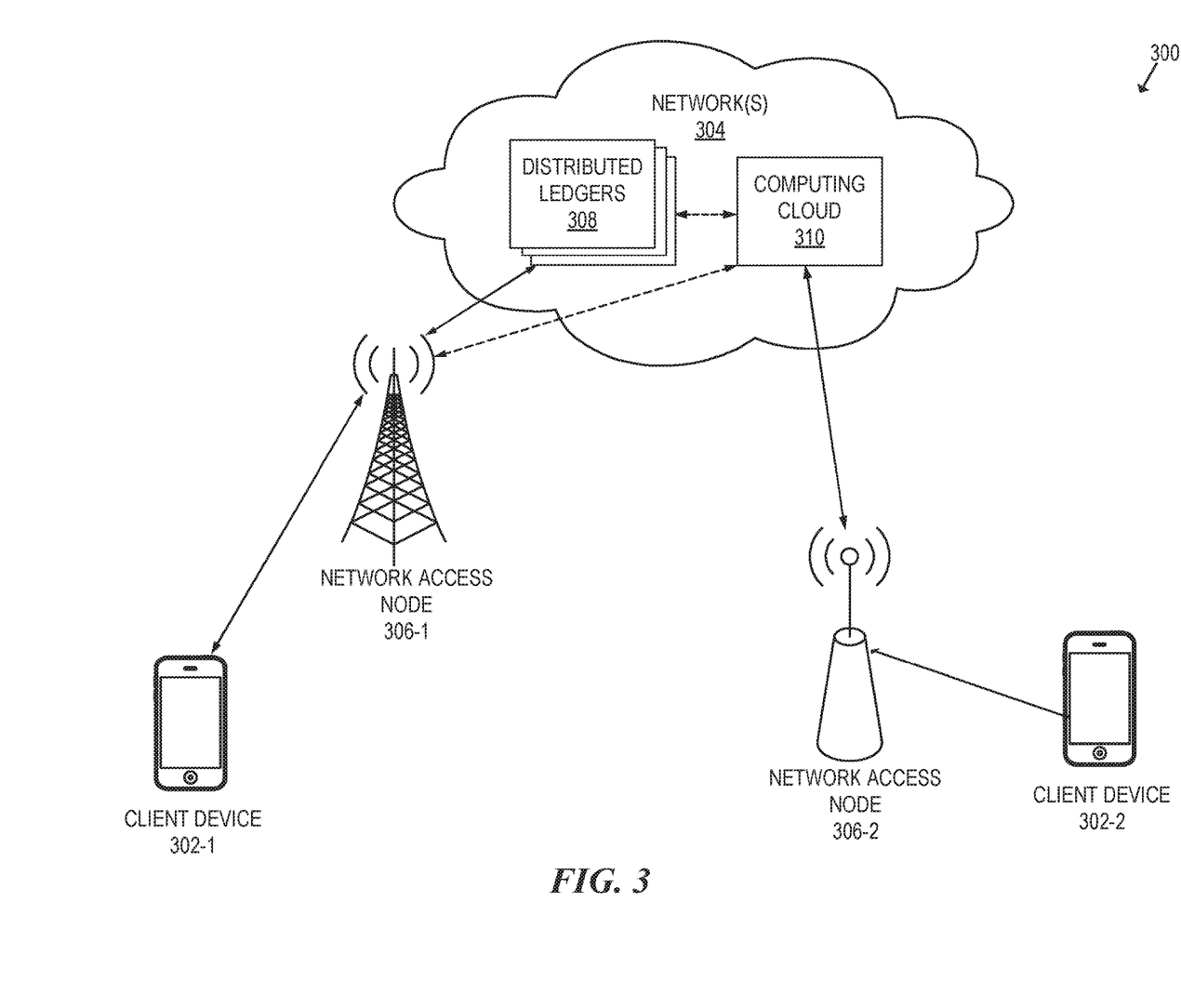
FIG. 3 is a block diagram illustrating an overview of an environment on which some implementations can operate.

FIG. 3 is a block diagram that illustrates a system that can allocate resources in a cloud computing environment using a 5G network and can validate and record interactions between entities in the cloud computing environment using a distributed ledger. The system 300 includes client devices 302-1 and 302-2 (collectively 302) that are communicatively coupled to one or more networks 304 via network access nodes 306-1 and 306-2 (referred to collectively as network access nodes 306).

Client device 302 is any type of electronic device that can communicate wirelessly with a network node and/or with another electronic device in a cellular, computer, and/or mobile communications system. Examples of the client device 302 include smartphones (e.g., APPLE IPHONE, SAMSUNG GALAXY), tablet computers (e.g., APPLE IPAD, SAMSUNG NOTE, AMAZON FIRE, MICROSOFT SURFACE), wireless devices capable of machine-to-machine (M2M) communication, wearable electronic devices, IoT devices, and any other device that is capable of accessing the network(s) 204. Although only two client devices 302 are illustrated in FIG. 3, the disclosed embodiments can include any number of client devices.

Client device 302 can store and transmit (e.g., internally and/or with other electronic devices over a network) code (composed of software instructions) and data using machine-readable media, such as non-transitory machine-readable media (e.g., machine-readable storage media such as magnetic disks, optical disks, read-only memory (ROM), flash memory devices, and phase change memory) and transitory machine-readable transmission media (e.g., electrical, optical, acoustical, or other forms of propagated signals, such as carrier waves or infrared signals).

Client device 302 can include hardware such as one or more processors coupled to sensors and a non-transitory machine-readable media to store code and/or sensor data, user input/output (I/O) devices (e.g., a keyboard, a touchscreen, and/or a display), and network connections (e.g., an antenna) to transmit code and/or data using propagating signals. The coupling of the processor(s) and other components is typically through one or more busses and bridges (also referred to as bus controllers). Thus, a non-transitory machine-readable medium of a given electronic device typically stores instructions for execution on a processor(s) of that electronic device. One or more parts of an embodiment of the present disclosure can be implemented using different combinations of software, firmware, and/or hardware.

Network access nodes 306 can be any type of radio network node that can communicate with a wireless device (e.g., client device 302) and/or with another network node. The network access nodes 206 can be a network device or apparatus. Examples of network access nodes include a base station (e.g., network access node 306-1), an access point (e.g., network access node 306-2), or any other type of network node such as a network controller, radio network controller (RNC), base station controller (BSC), a relay, transmission points, and the like.

The system 300 depicts different types of wireless access nodes 306 to illustrate that the client device 302 can access different types of networks through different types of network access nodes. For example, a base station (e.g., the network access node 306-1) can provide access to a cellular telecommunications system of the network(s) 304. An access point (e.g., the network access node 306-2) is a transceiver that provides access to a computer system of the network(s) 304.

Network(s) 304 can be a 5G network. In some implementations, network(s) 304 can include any combination of private, public, wired, or wireless systems such as a cellular network, a computer network, the Internet, and the like. Any data communicated over the network(s) 304 can be encrypted or unencrypted at various locations or along different portions of the networks. Examples of wireless systems include Wideband Code Division Multiple Access (WCDMA), High Speed Packet Access (HSPA), Wi-Fi, Wireless Local Area Network (WLAN), and Global System for Mobile Communications (GSM), GSM Enhanced Data Rates for Global Evolution (EDGE) Radio Access Network (GERAN), 4G or 5G wireless wide area networks (WWAN), and other systems that can also benefit from exploiting the scope of this disclosure.

Network(s) 304 can include a Unified Data Management (UDM) component that manages network user data in a single, centralized element and stores such data in a UDM database. The UDM database can collect data from client device 302 such as a location of the device, characteristics of use of the device with the 5G network (e.g., when the device typically requests content or services, when the device is in a sleep mode or turned off, types of or identities of other devices the device sends messages to or receives messages from, amount of data typically used), payment methods, payment plans, subscription plans with a provider of the 5G network, demographics of the user, user preferences including privacy preferences, or other devices on the subscription plan.

The system 300 includes distributed ledgers 308 (e.g., blockchains) that store interactions between entities such as client device 302, other devices, users, or groups of devices or users. The blockchains are generated by requests for interaction between entities (e.g., a blockchain for interactions between client device 302-1 and client device 302-2) and new blocks (e.g., allowed interactions) are communicated to the distributed ledger 308 via the network access nodes 306. The distributed ledger 308 is distributed over a combination of network nodes (e.g., peer nodes 202) that access or store device profile data or user profile data across other network nodes of a peer-to-peer network. The network nodes of the distributed ledger 308 can each replicate and store an identical copy of the interaction data and update independently. Although shown in the network(s) 304, the distributed ledger 308 can be located anywhere to maintain a tamper-proof copy of condition data.

The system 300 includes a computing cloud 310 that can dynamically partition computing resources for client devices 302 or users associated with client devices 302 (e.g., creating mini clouds on a per user or per device basis). Computing resources can include servers, applications, bandwidth on the 5G network, storage, among other resources. In some implementations, computing cloud 310 can allow interactions between client devices 302 after network nodes have reached consensus that the requesting devices are valid and are not under cyber-attack and have recorded this in distributed ledgers 308. To partition computing resources, the system can identify how many client devices 302 or users associated with client devices 302 are requesting services at one time, the computing resources required by each client device 302 or user associated with client device 302, and whether adequate computing resources are available based on the demand. The system can then assign computing resources to the client devices 302 or users associated with client devices 302 according to a priority of the client device 302 or the user associated with client device 302 if insufficient computing resources are available.

In some embodiments, computing cloud 310 can include any number of server computers (and other components as described with respect to FIG. 1) communicatively coupled to the client device 302 via the network access nodes 306. The computing cloud 310 can include combinations of hardware and/or software to process condition data, perform functions, communicate over the network(s) 304, etc. For example, server computers of the computing cloud 310 can include a processor, memory or storage, a transceiver, a display, operating system, application software, modules such as a registration module, profile module, partitioning module, and the like. Other components, hardware, and/or software included in the system 300 that are well known to persons skilled in the art are not shown or discussed herein for brevity. Moreover, although shown as being included in the network(s) 304, the computing cloud 310 can be located anywhere in the system 300 to implement the disclosed technology.

Network 304 or computing cloud 310 can create a device service profile and/or a user service profile using information from the UDM database such as the location of the device and characteristics of use with the 5G network. The system can also create profiles for groups of devices or groups of users. In some implementations, the device service profile, the user service profile, and/or groups of user or device profiles can be stored in the UDM database. Computing cloud 310 can access the profiles to partition computing resources within the computing cloud 310 on a per user/per device/per group of users/per group of devices basis and use the profile to partition computing resources within the computing cloud 310 for the device, user, group of devices, or group of users. In some implementations, network performance (e.g., latency requirements, jitter requirements, quality of service) can be defined based on the device service profile or the user service profile. Thus, a 5G network can track and record a device's or user's location, fetch and retrieve profiles from the UDM, and assist in the identification of the user's or device's service requirement based on factors (e.g., profile, demographics, user preferences, service subscription, payment method, location).

The partitions can be based on the profiles, a time-of-day and/or the location of the device, a time-of-day in the location of the device, and other factors as relevant to provide on-demand access to content or services in the cloud computing environment to the device over network 304. In some implementations, the system can allocate resources such that a network access node 306 intelligently provides the service or content. Thus, the system can instantiate 5G mobile edge computing such as a base station as a peering point based on a location detected by the 5G core. In allocating the resources, the system can determine whether a requested service will require more resources than are available (e.g., does the request include a request for real-time media transmission such as video call or is the request a request for non-real-time media transmission such as email which requires far less resources and then compare the requested resources with available resources). In cases where the adequate resources to service the request are unavailable at the moment, the system can send a notification instructing the user or the device to resubmit the request when the resources are available. The system can determine a time in which the resources will become available based on previous prioritizations and can communicate this time to the user or the device so that the user or the device does not resubmit the request multiple times, saving computing resources from re-evaluating the same request numerous times. Once the user or device submits the request, the request is positioned in a queue that reserves resources.

The dynamic partitioning provides efficiencies by making resources available for users when the resources are needed and shifting those resources away from the user when the user likely does not need the resources. For example, a typical first user in time zone 1 accesses content and services during the day in the time zone 1 (as associated with their location) and does not access such content during the night. Thus, the system can partition resources for the first user during daytime in time zone 1 and release these resources during nighttime in time zone 1 for the first user. The system can partition the released resources for a similarly situated second user in an opposite time zone (e.g., time zone 2) such that when the resources are released from the first user (e.g., during the night for the first user), they are partitioned for the second user (e.g., during the day for the second user). In a further example, some devices have commonalities in which partitioning by group is helpful. For example, in many places, sprinkler systems water at times other than the heat of the day (e.g., in the evenings, at night or in the early mornings). The system can partition resources for connected sprinkler systems in a location from 8 p.m. to 8 a.m. Partitioning on a per user or per device basis and partitioning based on factors particular to the user or the device (or groups of each) allows for scalability, flexibility and use of the system by billions of devices.

If the user or device requests services or content during a time that the resources are not partitioned for the device or the user, the system can accommodate the user by temporarily shifting resources partitioned to another user or device that is not currently using the computing resources. The device's (or user's) request for access to content or services at a time when resources are not typically partitioned to the device or user can be documented in the UDM database. The system can change the user service profile or the device service profile should the request for interaction continue to occur at times the resources are not allocated to the user or device.

Some users will provide user preferences such as quality of service level preferences specifying times at which the user's quality of service level needs to be high and privacy preferences including opting out of location tracking services. Additional user preferences can include media preferences (e.g., audio vs. video vs. text). The system can reserve resources based on user preferences. That is, if a user preference indicates that the user's preference is video but available resources are sufficient only for audio, the system can send a request asking whether audio is sufficient or whether the user would prefer video. If the user selects video, the request can be placed in a queue. In some embodiments, an estimated wait time until sufficient resources are available can be provided to the user or the device. In some implementations, the system can allocate resources based on triggering events such as an emergency, natural disaster, or user-defined events. The triggering events can override the user's preferences. For example, if the system detects (e.g., via a news outlet or information from providing typical services) that the device or user is in the path of a natural disaster, location tracking can be engaged regardless of a user's privacy preferences. Additionally, additional resources can be allocated to all devices or users in a location within a radius of the natural disaster. Dynamically partitioning computing resources by device, user, groups of devices or groups of users provides access to content and services to billions of devices.

The system can use distributed ledger technology to prevent or reduce cyber-attacks and fraud. For example, as discussed above, partitions of computing resources can be created for each entity (e.g., device, user, group of devices or users). The system can create a blockchain ledger for interactions between each entity that can be engaged when one of the entities attempts an interaction with another entity or upon a different triggering event and can be disengaged when the entities are not interacting, therefore reducing computing power consumption and computing resources required to validate transactions. Thus, a blockchain ledger can be "disengaged" when computing resources used for authenticating the entities for interactions (e.g., the nodes that provide consensus) are not allocated to the blockchain ledger. The blockchain ledger can be "engaged" or "reengaged" when the computing resources again become available or upon a next interaction request between the entities, assuming that computing resources are available or can be made available.

When the system receives a request for an interaction between one entity and another entity (e.g., client device 302-1 attempts a call with client device 302-2), the system can create a blockchain ledger that is specific to interactions between these two devices, or if the blockchain ledger is already created (e.g., the two entities have previously interacted), the system can engage the blockchain ledger. Various network nodes in the blockchain community in the cloud computing environment can evaluate the entities and the request to ensure that the entities are not under cyber-attack and that the request is valid (e.g., this type of request is expected from this device). In response to receiving consensus from nodes within the blockchain community within the cloud computing environment that the request is valid and the devices are not under a cyber-attack, the system can allow the interaction and a block noting the interaction can be appended to the blockchain ledger. The nodes can use information in the UDM database such as profile information as well as other interactions between the devices to validate the interaction and authenticate the devices. The Access and Mobility Management Function (AMF) of the 5G network (or other management system) can engage or disengage the blockchain ledger according to the user profile as specified by the UDM. Additionally, the Policy Control Function of the 5G network (or other policy system) can dynamically update policies according to the 5G network resource availability. In some implementations, computing resources (e.g., mini-clouds) for the entities can be the nodes and can be used to authenticate the interactions between the entities.

In response to not receiving consensus from the blockchain community, the system can disallow the interaction and allocate resources to determine whether the device is under or at risk of a cyber-attack (e.g., review interactions such as use of the 5G network or responses to status checks, check the status of a manufacturer or provider of the device). Using a blockchain or similar technology to validate entities prior to interactions increases the security of the 5G network.

The blockchain ledgers can stay dormant until a triggering event occurs (e.g., one entity requests an interaction with another entity). Other triggering events include emergency situations. For example, the system can determine the user has been in a car accident (e.g., the user's car system calls emergency services) and thus, the system can intelligently conclude that the user will call the user's insurance company. Thus, the blockchain ledger can be created or re-engaged (e.g., allocate resources for the blockchain ledger) before the request is made. Additional triggering events can be based on expected user's user preferences such as preferences for media type (e.g., gaming, content streaming services such as Netflix, electronic books, music streaming). For example, the system can identify when a user who plays on-line games will be playing and can engage a blockchain ledger to address these interactions. Another type of triggering event can include events that are particularized to the user such as special occasions (e.g., the user's birthday or birthdays of friends and family of the user). The system can identify these events and can allocate additional resources for the user on such days, expecting that the user will interact with additional entities and that blockchains legers will be engaged. In some embodiments, the system can use historical interactions in developing allocating policies.

Those skilled in the art will appreciate that the components illustrated in FIGS. 1-3 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 4:
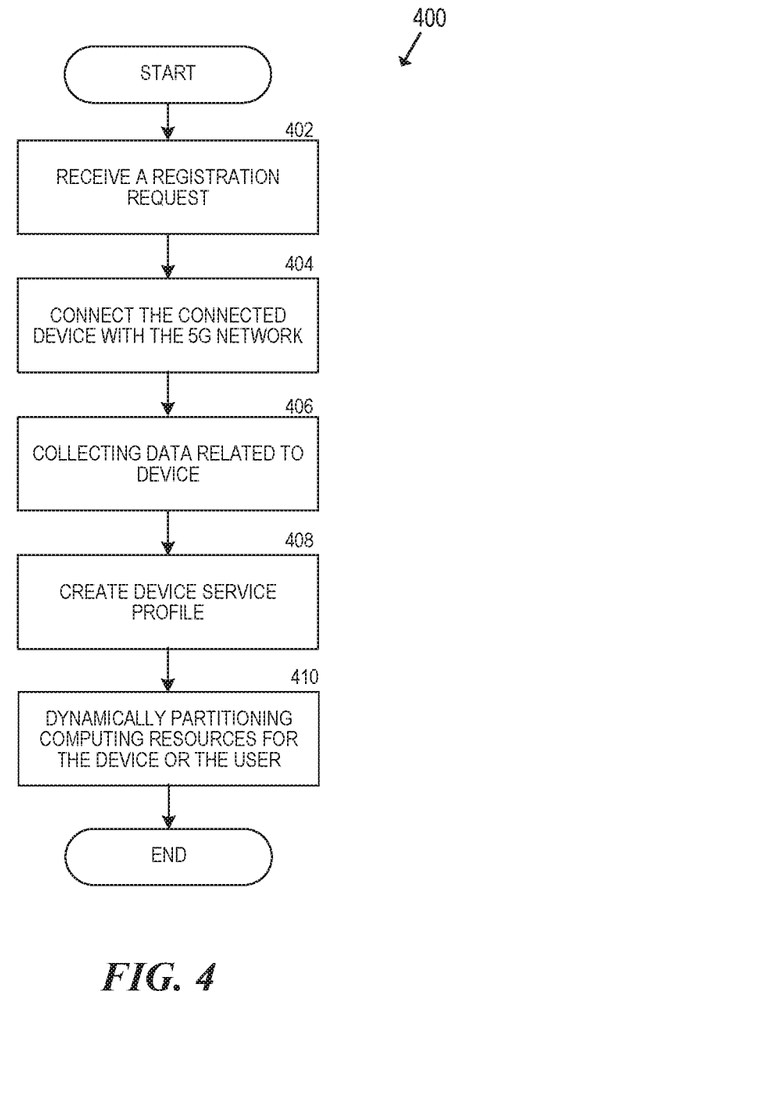
FIG. 4 is a flow diagram illustrating a process used in some implementations for allocating resources in a cloud computing environment using a 5G network.

FIG. 4 is a flow diagram illustrating a process used in some implementations for allocating resources in a cloud computing environment using a 5G network. Receiving operation 402 receives a registration request from a device to connect to a 5G network. After performing a registration process, the system can connect the device to the 5G network in connecting operation 404. Collecting operation 406 collects data related to the device. The data can include a location of the device, characteristics of use of the device with the 5G network (e.g., when the device typically requests content or services, when the device is in a sleep mode or turned off, other devices the device sends messages to or receives messages from, amount of data typically used), payment methods, payment plans, subscription plan with a provider of the 5G network, demographics of the user, user preferences including privacy preferences, or other devices on the subscription plan.

Creating operation 408 can create a device service profile of the device (or a user service profile of the user associated with the device) based on at least some of the data associated with the device (or the user). The data associated with the device and the device service profile or the user service profile can be stored in a UDM database of the 5G network. Partitioning operation 410 dynamically partitions computing resources within the cloud computing environment (e.g., storage, bandwidth, servers, applications) for the device based on the device service profile and a time-of-day in the location of the device, thereby providing on-demand access to content or services in the cloud computing environment to the device over the 5G network. When the device requests access to service or content during times that the computing resources are not allocated to the device, the system can re-partition the computing resources to provide the on-demand access (e.g., device is requesting or pulling resources).

Figure 5:
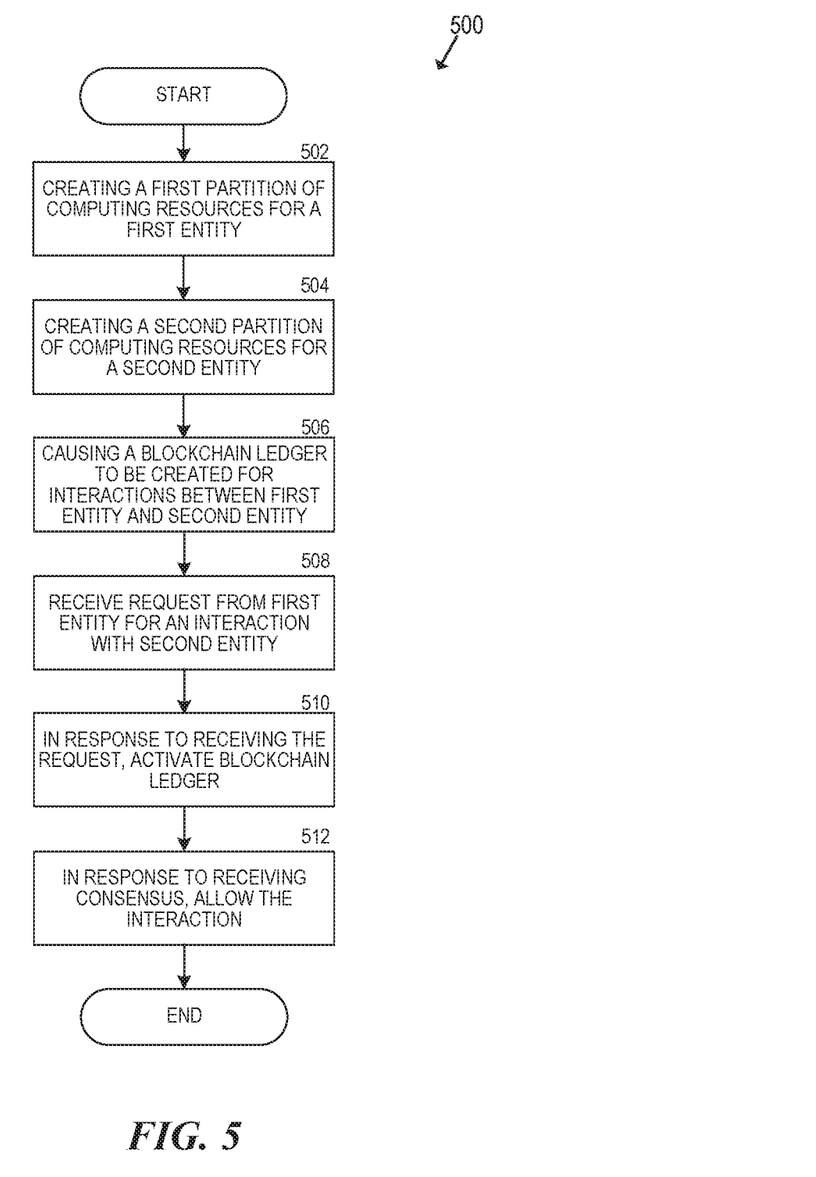
FIG. 5 is a flow diagram illustrating a process used in some implementations for documenting and verifying interactions in a cloud computing environment using a 5G network.

FIG. 5 is a flow diagram illustrating a process used in some implementations for documenting and verifying interactions in a cloud computing environment using a 5G network. Creating operation 502 creates a first partition of computing resources for a first entity (e.g., device, user, group of devices, group of users). Creating operation 504 creates a second partition of the computing resources for a second entity. Causing operation 506 causes a blockchain ledger to be created for interactions between the first entity and the second entity. The blockchain ledger can be disengaged when the first entity and the second entity are not interacting and engaged when the first entity and second entity are interacting. Receiving operation 508 receives a request from the first entity for an interaction with the second entity. In response to receiving the request, activating operation 510 activates the blockchain ledger. In response to receiving consensus from the blockchain community within the cloud computing environment, allowing operation 512 allows the interaction.

Figure 6:
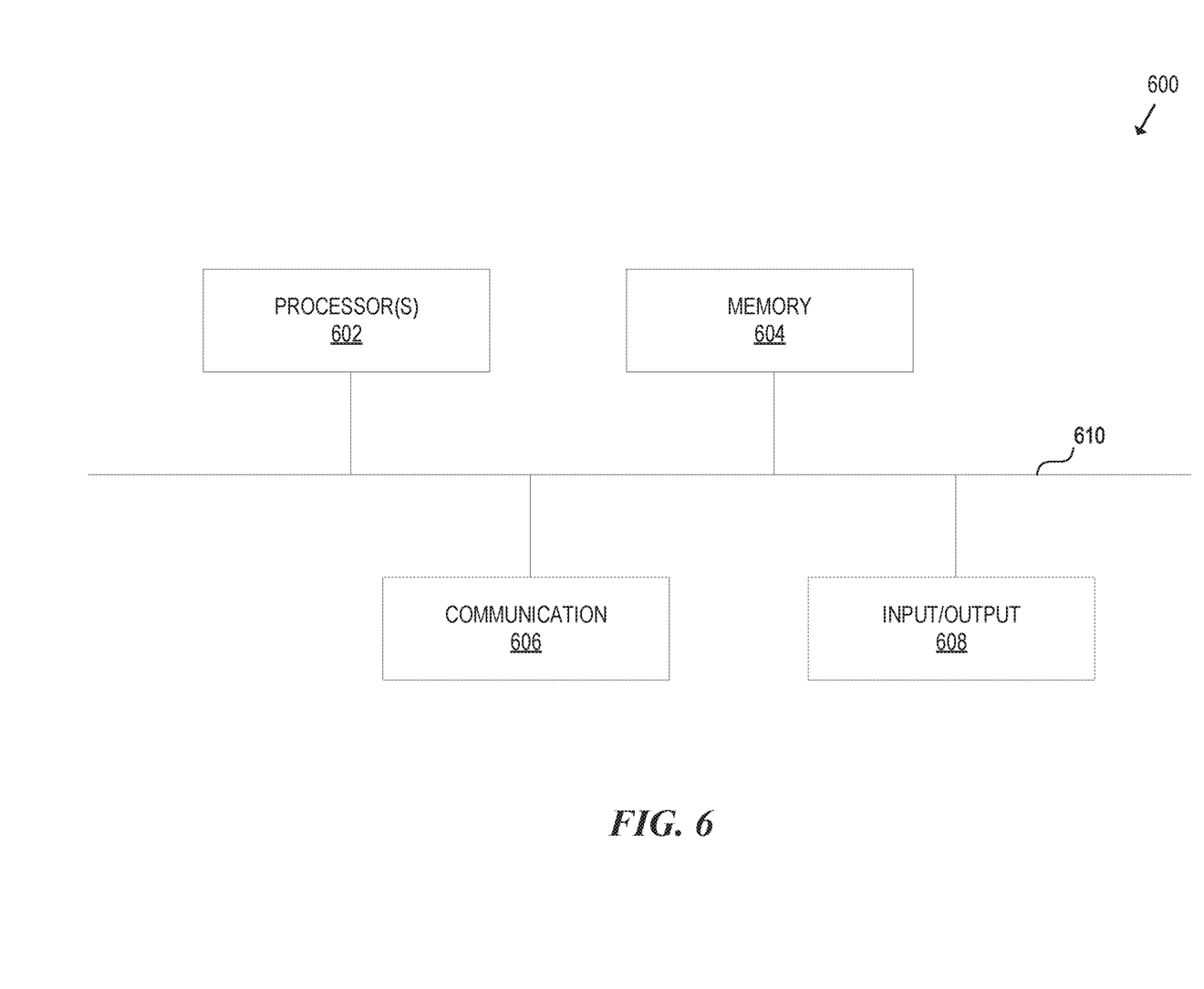
FIG. 6 is a block diagram that illustrates an example processing system in which aspects of the disclosed technology can be embodied.

FIG. 6 is a block diagram that illustrates an example of a processing system 600 in which at least some operations described herein can be implemented. The processing system 600 represents a system that can run any of the methods/algorithms described herein. For example, any network access device (e.g., client device 302, access node 306-2) or network component (access node 306-1 or computing cloud 310) can include or be part of a processing system 600. The processing system 600 can include one or more processing devices, which can be coupled to each other via a network or multiple networks. A network can be referred to as a communication network or telecommunications network.

In the illustrated embodiment, the processing system 600 includes one or more processors 602, memory 604, a communication device 606, and one or more input/output (I/O) devices 608, all coupled to each other through an interconnect 610. The interconnect 610 can be or include one or more conductive traces, buses, point-to-point connections, controllers, adapters and/or other conventional connection devices. Each of the processor(s) 602 can be or include, for example, one or more general-purpose programmable microprocessors or microprocessor cores, microcontrollers, application-specific integrated circuits (ASICs), programmable gate arrays, or the like, or a combination of such devices.

The processor(s) 602 control the overall operation of the processing system 500. Memory 504 can be or include one or more physical storage devices, which can be in the form of random-access memory (RAM), read-only memory (ROM) (which can be erasable and programmable), flash memory, miniature hard disk drive, or other suitable type of storage device, or a combination of such devices. Memory 604 can store data and instructions that configure the processor(s) 602 to execute operations in accordance with the techniques described above. The communication device 606 can be or include, for example, an Ethernet adapter, cable modem, Wi-Fi adapter, cellular transceiver, Bluetooth transceiver, or the like, or a combination thereof. Depending on the specific nature and purpose of the processing system 600, the I/O devices 608 can include devices such as a display (which can be a touch screen display), audio speaker, keyboard, mouse or other pointing devices, microphone, camera, etc.

While processes or blocks are presented in a given order, alternative embodiments can perform routines having steps or employ systems having blocks, in a different order, and some processes or blocks can be deleted, moved, added, subdivided, combined and/or modified to provide alternative or sub-combinations, or can be replicated (e.g., performed multiple times). Each of these processes or blocks can be implemented in a variety of different ways. In addition, while processes or blocks are at times shown as being performed in series, these processes or blocks can instead be performed in parallel or can be performed at different times. When a process or step is "based on" a value or a computation, the process or step should be interpreted as based at least on that value or that computation.

Software or firmware to implement the techniques introduced here can be stored on a machine-readable storage medium and can be executed by one or more general-purpose or special-purpose programmable microprocessors. A "machine-readable medium", as the term is used herein, includes any mechanism that can store information in a form accessible by a machine (a machine can be, for example, a computer, network device, cellular phone, personal digital assistant (PDA), manufacturing tool, any device with one or more processors, etc.). For example, a machine-accessible medium includes recordable/non-recordable media (e.g., read-only memory (ROM), random-access memory (RAM), magnetic disk storage media, optical storage media, flash memory devices), etc.

Note that any and all of the embodiments described above can be combined with each other, except to the extent that it may be stated otherwise above, or to the extent that any such embodiments might be mutually exclusive in function and/or structure. Although the present invention has been described with reference to specific exemplary embodiments, it will be recognized that the invention is not limited to the embodiments described but can be practiced with modification and alteration within the spirit and scope of the disclosed embodiments. Accordingly, the specification and drawings are to be regarded in an illustrative sense rather than a restrictive sense.

Physical and functional components (e.g., devices, engines, modules, and data repositories) associated with processing system 600 can be implemented as circuitry, firmware, software, other executable instructions, or any combination thereof. For example, the functional components can be implemented in the form of special-purpose circuitry, in the form of one or more appropriately programmed processors, a single board chip, a field-programmable gate array, a general-purpose computing device configured by executable instructions, a virtual machine configured by executable instructions, a cloud computing environment configured by executable instructions, or any combination thereof. For example, the functional components described can be implemented as instructions on a tangible storage memory capable of being executed by a processor or other integrated circuit chip. The tangible storage memory can be computer-readable data storage. The tangible storage memory can be a volatile or non-volatile memory. In some embodiments, the volatile memory can be considered "non-transitory" in the sense that it is not a transitory signal. Memory space and storage described in the figures can be implemented with the tangible storage memory as well, including volatile or non-volatile memory.

Each of the functional components can operate individually and independently of other functional components. Some or all of the functional components can be executed on the same host device or on separate devices. The separate devices can be coupled through one or more communication channels (e.g., wireless or wired channel) to coordinate their operations. Some or all of the functional components can be combined as one component. A single functional component can be divided into sub-components, each sub-component performing separate method steps or a method step of the single component.

In some embodiments, at least some of the functional components share access to a memory space. For example, one functional component can access data accessed by or transformed by another functional component. The functional components can be considered "coupled" to one another if they share a physical connection or a virtual connection, directly or indirectly, allowing data accessed or modified by one functional component to be accessed in another functional component. In some embodiments, at least some of the functional components can be upgraded or modified remotely (e.g., by reconfiguring executable instructions that implement a portion of the functional components). Other arrays, systems, and devices described above can include additional, fewer, or different functional components for various applications.

Aspects of the disclosed embodiments may be described in terms of algorithms and symbolic representations of operations on data bits stored in memory. These algorithmic descriptions and symbolic representations generally include a sequence of operations leading to the desired result. The operations require physical manipulations of physical quantities. Usually, though not necessarily, these quantities take the form of electric or magnetic signals that are capable of being stored, transferred, combined, compared, and otherwise manipulated. Customarily, and for convenience, these signals are referred to as bits, values, elements, symbols, characters, terms, numbers, or the like. These and similar terms are associated with physical quantities and are merely convenient labels applied to these quantities.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number can also include the plural or singular number respectively. The word "or," in reference to a list of two or more items, covers all of the following interpretations of the word: any of the items in the list, all of the items in the list, and any combination of the items in the list.

The above-detailed description of embodiments of the system is not intended to be exhaustive or to limit the system to the precise form disclosed above. While specific embodiments of, and examples for, the system are described above for illustrative purposes, various equivalent modifications are possible within the scope of the system, as those skilled in the relevant art will recognize. For example, some network elements are described herein as performing certain functions. Those functions could be performed by other elements in the same or differing networks, which could reduce the number of network elements. Alternatively, or additionally, network elements performing those functions could be replaced by two or more elements to perform portions of those functions. In addition, while processes, message/data flows, or blocks are presented in a given order, alternative embodiments may perform routines having steps, or employ systems having blocks, in a different order, and some processes or blocks may be deleted, moved, added, subdivided, combined, and/or modified to provide alternative or sub-combinations. Each of these processes, message/data flows, or blocks may be implemented in a variety of different ways. Also, while processes or blocks are at times shown as being performed in series, these processes or blocks may instead be performed in parallel or may be performed at different times. Further any specific numbers noted herein are only examples: alternative implementations may employ differing values or ranges. Those skilled in the art will also appreciate that the actual implementation of a database can take a variety of forms, and the term "database" is used herein in the generic sense to refer to any data structure that allows data to be stored and accessed, such as tables, linked lists, arrays, etc.

The teachings of the methods and system provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the technology can be modified, if necessary, to employ the systems, functions, and concepts of the various references described above to provide yet further embodiments of the technology.

These and other changes can be made to the invention in light of the above Detailed Description. While the above description describes certain embodiments of the technology, and describes the best mode contemplated, no matter how detailed the above appears in text, the invention can be practiced in many ways. Details of the system may vary considerably in its implementation details, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments but also all equivalent ways of practicing or implementing the invention under the claims.

While certain aspects of the technology are presented below in certain claim forms, the inventors contemplate the various aspects of the technology in any number of claim forms. For example, while only one aspect of the invention is recited as embodied in a computer-readable medium, other aspects can likewise be embodied in a computer-readable medium. Accordingly, the inventors reserve the right to add additional claims after filing the application to pursue such additional claim forms for other aspects of the technology.

We claim:

1. A method of allocating resources in a cloud computing environment, the method comprising:
   receiving, by a 5G network, a registration request from a device associated with a user,
      wherein the device associated with the user is a wireless mobile device;
   connecting the device to the 5G network;
   collecting, from the device, data related to the device,
      wherein the data related to the device includes a location of the device and characteristics of use of the device with the 5G network;
   creating, by a computing device associated with the 5G network, a device service profile of the device based at least in part on the location of the device and the characteristics of use of the device with the 5G network;
   dynamically partitioning cloud computing resources within the cloud computing environment to create a personal cloud on a per device basis for the device based on the device service profile and a time-of-day in the location of the device to thereby provide on-demand access to content or services in the personal cloud of the cloud computing environment to the device over the 5G network, wherein the personal cloud is associated with a range of times-of-day; and
   in response to receiving from the device a request for access to the personal cloud and determining that the time-of-day in the location of the device is outside of the range of times-of-day associated with the personal cloud, transmitting a notification that indicates (i) unavailability of the personal cloud, and (ii) a subsequent time-of-day at which the personal cloud is predicted to be available.

2. The method of claim 1, further comprising:
   creating a user service profile of the user based on at least three of: user preferences, demographics, service subscription with a 5G network service provider, payment method, or the location of the device associated with the user,
      wherein dynamically partitioning cloud computing resources within the cloud computing environment to create a personal cloud for the device is further based on the user service profile.

3. The method of claim 2, further comprising:
   storing the device service profile and the user service profile in a 5G Unified Data Management database;
   connecting, by the 5G network, the device with the cloud computing environment; and
   instantiating a base station associated with the 5G network as a peering point to the cloud computing environment.

4. The method of claim 1, further comprising:
   defining network resource allocation and network performance criteria for the device based on the device service profile and the time-of-day in the location,
      wherein the network resource allocation comprises bandwidth allocation, and
      wherein the performance criteria comprises latency requirements and jitter requirements.

5. The method of claim 1, wherein the cloud computing resources within the cloud computing environment are partitioned with the cloud computing resources available for the device during a first portion of a twenty-four hour period, wherein the cloud computing resources within the cloud computing environment are partitioned with no cloud computing resources available for the device during a second portion of the twenty-four hour period, wherein the method further comprises:
   receiving, from the device, a request for access to content or services in the cloud computing environment during the second portion of the twenty-four hour period; and
   re-partitioning the cloud computing resources to provide the on-demand access to the content or services to the device.

6. The method of claim 1, further comprising:
   analyzing the data collected from the device;
   identifying an emergency situation based on the analysis; and
   re-partitioning the cloud computing resources within the cloud computing environment to adjust the personal cloud for the device based on the emergency situation.

7. The method of claim 1, further comprising:
   creating, by the computing device associated with the 5G network, a group device service profile for a group of devices based at least in part on user preferences of users associated with devices in the group of devices and characteristics of use of the devices in the group of devices with the 5G network; and
   dynamically partitioning cloud computing resources within the cloud computing environment to create a group cloud for the group of devices based on the group device service profile to thereby provide on-demand access to content or services in the cloud computing environment to the group of devices over the 5G network.

8. At least one non-transitory, computer-readable medium, storing instructions, which when executed by at least one data processor, performs a method of allocating resources in a cloud computing environment, the method comprising:
receiving, by a 5G network, a registration request from a device associated with a user, wherein the device associated with the user is a wireless mobile device;
connecting the device to the 5G network;
collecting, from the device, data related to the device, wherein the data related to the device includes a location of the device and characteristics of use of the device with the 5G network;
creating, by a computing device associated with the 5G network, a device service profile of the device based at least in part on the location of the device and the characteristics of use of the device with the 5G network;
dynamically partitioning cloud computing resources within the cloud computing environment to create a personal cloud on a per device basis for the device based on the device service profile and a time-of-day in the location of the device to thereby provide on-demand access to content or services in the personal cloud of the cloud computing environment to the device over the 5G network, wherein the personal cloud is associated with a range of times-of-day; and
in response to receiving from the device a request for access to the personal cloud and determining that the time-of-day in the location of the device is outside of the range of times-of-day associated with the personal cloud, transmitting a notification that indicates (i) unavailability of the personal cloud, and (ii) a subsequent time-of-day at which the personal cloud is predicted to be available.

9. The at least one non-transitory, computer-readable medium of claim 8, wherein the method further comprises:
creating a user service profile of the user based on at least three of: user preferences, demographics, service subscription with a 5G network service provider, payment method, or the location of the device associated with the user,
wherein dynamically partitioning cloud computing resources within the cloud computing environment to create the personal cloud for the device is further based on the user service profile.

10. The at least one non-transitory, computer-readable medium of claim 9, wherein the method further comprises:
storing the device service profile and the user service profile in a 5G Unified Data Management database.

11. The at least one non-transitory, computer-readable medium of claim 8, wherein the method further comprises:
defining network resource allocation and network performance criteria for the device based on the device service profile and the time-of-day in the location,
wherein the network resource allocation comprises bandwidth allocation, and
wherein the performance criteria comprises latency requirements and jitter requirements.

12. The at least one non-transitory, computer-readable medium of claim 8, wherein the method further comprises:
connecting, by the 5G network, the device with the cloud computing environment; and
instantiating a base station associated with the 5G network as a peering point to the cloud computing environment.

13. The at least one non-transitory, computer-readable medium of claim 8, wherein the device service profile is further based on user preferences, wherein the user preferences include privacy preferences, wherein the method further comprises:
creating a device service policy relating to the device based on the device service profile;
identifying an emergency situation relating to the location of the device; and
re-partitioning the cloud computing resources within the cloud computing environment to adjust the personal cloud for the device based on the emergency situation regardless of the privacy preferences.

14. The at least one non-transitory, computer-readable medium of claim 8, wherein the method further comprises:
creating, by the computing device associated with the 5G network, a group device service profile for a group of devices based at least in part on user preferences of users associated with devices in the group of devices and characteristics of use of the devices in the group of devices with the 5G network; and
dynamically partitioning cloud computing resources within the cloud computing environment to create a group cloud for the group of devices based on the group device service profile to thereby provide on-demand access to content or services in the cloud computing environment to the group of devices over the 5G network.

15. A system for allocating resources in a cloud computing environment, the system comprising:
a memory;
a processor in communication with the memory, the processor operable to execute software modules, the software modules comprising:
a registration module configured to:
receive, by a 5G network, a registration request from a device associated with a user,
wherein the device associated with the user is a wireless mobile device, and
connect the device to the 5G network;
a profile module configured to:
collect, from the device, data related to the device, wherein the data related to the device includes
a location of the device, and
characteristics of use of the device with the 5G network, and
create, by a computing device associated with the 5G network, a device service profile of the device based at least in part on the location of the device and the characteristics of use of the device with the 5G network;
a partitioning module configured to:
dynamically partition cloud computing resources within the cloud computing environment to create a personal cloud on a per device basis for the device based on the device service profile and a time-of-day in the location of the device to thereby provide on-demand access to content or services in the personal cloud of the cloud computing environment to the device over the 5G network, wherein the personal cloud is associated with a range of times-of-day; and a notification module configured to:
  in responsive to receiving from the device a request for access to the personal cloud and determining that the time-of-day in the location of the device is outside of the range of times-of-day associated with the personal cloud, transmit a notification that indicates (i) unavailability of the personal cloud, and (ii) a subsequent time-of-day at which the personal cloud is predicted to be available.

16. The system of claim 15, wherein the profile module is further configured to:
  create a user service profile of the user based on at least three of: user preferences, demographics, service subscription with a 5G network service provider, payment method, or the location of the device associated with the user,
    wherein dynamically partitioning cloud computing resources within the cloud computing environment to create the personal cloud for the device is further based on the user service profile; and
  store the device service profile and the user service profile in a 5G Unified Data Management database.

17. The system of claim 15, wherein the partitioning module is further configured to:
  define network resource allocation and network performance criteria for the device based on the device service profile and the time-of-day in the location,
    wherein the network resource allocation comprises bandwidth allocation, and
    wherein the performance criteria comprises latency requirements and jitter requirements.

18. The system of claim 15, wherein the registration module is further configured to:
  connect, by the 5G network, the device with the cloud computing environment; and
  instantiating a base station associated with the 5G network as a peering point to the cloud computing environment.

19. The system of claim 15, wherein the profile module is further configured to
  analyze the data collected from the device, and
  identify an emergency situation based on the analysis,
    wherein the partitioning module is further configured to re-partition the cloud computing resources within the cloud computing environment to create the personal cloud for the device based on the emergency situation.

20. The system of claim 15, wherein the profile module is further configured to:
  create, by the computing device associated with the 5G network, a group device service profile for a group of devices based at least in part on user preferences of users associated with devices in the group of devices and characteristics of use of the devices in the group of devices with the 5G network; and
  dynamically partition cloud computing resources within the cloud computing environment to create a group cloud for the group of devices based on the group device service profile to thereby provide on-demand access to content or services in the cloud computing environment to the group of devices over the 5G network.

* * * * *